United States Patent [19]

Russillo et al.

[11] 4,138,697

[45] Feb. 6, 1979

[54] DATA RECORDING SYSTEM FOR INDICATING POWER OUTAGE ON MASTER AND SLAVE RECORDERS

[75] Inventors: Joseph G. Russillo, Dover, N.H.; William C. Earl, Corona, Calif.

[73] Assignee: General Electric Company, Somersworth, N.H.

[21] Appl. No.: 882,739

[22] Filed: Mar. 2, 1978

[51] Int. Cl.² .................... G11B 5/00; G11B 15/12
[52] U.S. Cl. .................................. 360/6; 360/63
[58] Field of Search ............... 360/6, 22, 63, 61, 68, 360/137; 346/44

[56] References Cited

U.S. PATENT DOCUMENTS

| | | | |
|---|---|---|---|
| 3,333,247 | 7/1967 | Hadley et al. | 360/6 |
| 3,422,441 | 1/1969 | Chapsky | 360/6 |
| 3,461,429 | 8/1969 | Gray | 346/44 |
| 4,012,784 | 3/1977 | Murphy et al | 360/63 |
| 4,084,151 | 4/1978 | Penner | 360/6 |

Primary Examiner—Vincent P. Canney
Attorney, Agent, or Firm—Robert E. Brunson; Francis X. Doyle

[57] ABSTRACT

A data recording system includes a master tape recorder interconnected to a plurality of slave recorders. Each recorder is adapted to record meter data provided thereto from a meter associated with each recorder. The master recorder includes a timing circuit for effecting the recording of interval marks at periodic intervals on tape of all of the recorders as a time reference for the meter data of each recorder. The timing circuit also includes means for detecting a power outage to the recorders to generate a power outage pulse which effects the writing of a power outage indication by all of the recorders.

5 Claims, 6 Drawing Figures

SLAVE RECORDER

DATA RECORDING SYSTEM FOR INDICATING POWER OUTAGE ON MASTER AND SLAVE RECORDERS

BACKGROUND OF THE INVENTION

This invention relates generally to utility metering systems of the type including a recorder for providing a recorded indication of a power outage condition to the recorder in conjunction with meter data and time interval information, and more particularly to such systems in which a master recorder contains circuitry for effecting the recording of a power outage indication by the master recorder and directing a plurality of slave recorders to record the same power outage indication.

Data recorders have been in use in the utility industry for years to accumulate meter pulse data on magnetic tape for later translation and calculation of power demand, billing and load survey. Typical recorders of this type are described in U.S. Pat. Nos. 3,913,129; 3,829,772; 3,375,526; 3,148,329; and 3,401,395. Another well known recorder for recording meter data pulses, time interval pulses and which records a power outage indication, is a demand recorder marketed by General Electric Company as the Model PDM-76 Demand Recorder and is disclosed in that Company's publication GEI-52489, entitled Maintenance Instructions, PDM-76 Demand Recorder. In the U.S. Pat. No. 3,913,129 and in the above GEI-52489 publication, recorders using magnetic tape cartridges capable of operating over extended recording periods are disclosed. In these recorders, when the beginning and the ending times of a recording period are known, a precise time record of the occurrence of the meter data is known by correlating real time to time interval pulses recorded by the recorders. Utilizing the data and time interval record on the tape, power consumption, maximum demand billing, and peak load information are conveniently calculated.

In the prior art, the aforementioned data recorders each contain their own circuitry for recording the data information, and the time interval and power outage indications. When measurements are to be from several meters, a separate recorder is required for each meter. In the systems of this type, several recorders are frequently used, and those recorders are all frequently powered from the same power source. As a result, they all operate from the same source to record their respective time interval information and they all stop simultaneously if there is a power outage. Additionally, they all operate from the same power source to individually write a power outage indication on their respective magnetic tapes when power is restored. The aforementioned recorders all function well to record the just described information, however, since each recorder is totally independent, containing its own circuitry for recording the interval and power outage information, it is expensive to the utilities, since a complete independent recorder must be purchased for each meter in the system. It is also difficult to synchronize the recorders, since each has its own timing circuit which must be individually set on time. To reduce the cost of recorders to the utility companies, a system of recorders is needed in which only one recorder, a master, contains all of the required time interval and power outage indication circuitry, and a plurality of other recorders, minus that circuitry, are slaved to the master recorder. In such a system, all of the recorders are synchronized with the master recorder to simultaneously record their respective meter data and the time interval and power outage indication information. The aforementioned PDM-76 demand recorder forms such a master recorder, and can serve as such in the present invention. Additionally, that recorder is suitably adaptable to serve as an economical slave recorder in a data recording system in accordance with the present invention.

Therefore, it is an object of the present invention to provide an improved data recording system of the type for providing time interval and power outage indications on a recording tape.

It is another object of the invention to provide a data recording system wherein a plurality of slave recorders are slaved to a master recorder to effect the synchronous recording of time interval and power outage information on the recording tape of each recorder.

A still further object of the invention is to provide a master recorder having recording circuitry for generating time and power outage information signals for recording information representative thereof by the master recorder and by at least one slave recorder not having the recording circuitry.

SUMMARY OF THE INVENTION

The present invention accomplishes the foregoing objects by the provision of a data recording system for recording meter data including a master recorder which provides time interval pulses and power outage indication pulses to a plurality of slave recorders. Only the master recorder contains a timing circuit which periodically generates end-of-interval pulses which serve as a time reference for the meter data recorded by the master recorder. The timing circuit also includes means for detecting a power outage condition which lasts in excess of a predetermined time duration to generate a power outage pulse. The time interval and power outage pulses are applied to a time record circuit in the master recorder to record time interval and power outage indications on the recording tape of the master recorder.

Each of the slave recorders also records meter data. Additionally, the slave recorders can be manufactured at less cost than the master recorder since they do not contain the timing circuitry of the master recorder. The slave recorders, each however, contain a time record circuit similar to the master recorder. Through a connecting means, the slave and master recorder time record circuits are interconnected, whereby the time interval and power outage information is simultaneously written on all of the recorders in accordance with their generation by the master reocrder.

All of the recorders are powered from the same source, thus the recorders all operate or stop in response to the presence or absence of power to the recorders. When the recorders are operating, they record meter data from respectively associated meters with the slave recorders being synchronized to the master recorder to simultaneously record the time interval information by all of the recorders. Subsequent to a power outage condition, all recorders simultaneously record a power outage indication when a power outage pulse is generated by the master recorder. In this manner, each recorder provides a record of meter data correlated with a time reference as defined by the time interval information and also a record which indicates that a power outage has occurred and in which time interval the outage occurred.

BRIEF DESCRIPTION OF THE DRAWING

Other objects, features and advantages of the present invention will now become more fully apparent from the following detailed description of the preferred embodiment, the appended claims and the accompanying drawing in which:

THE DESCRIPTION OF THE PREFERRED EMBODIMENT

Figure 1:
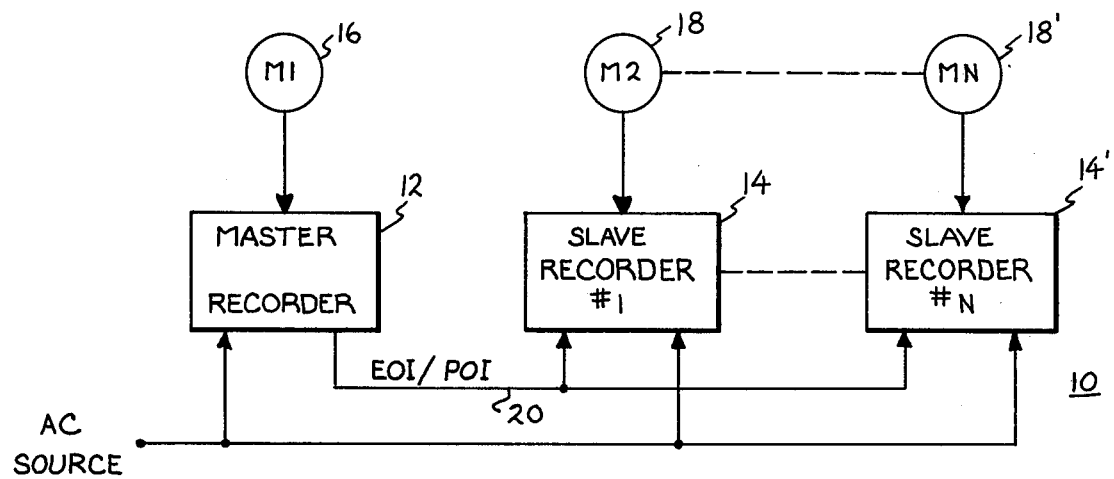
FIG. 1 is a major block diagram of a data recording system illustrating the interconnection of the master recorder and a plurality of slave recorders in accordance with the present invention.

Reference is now made to FIG. 1 which illustrates a data recording system 10 in major block diagram form in accordance with the present invention. A master recorder 12 receives meter data information in the form of pulses from a meter M1 designated by numeral 16. The pulses from meter 16 are generated in a well known fashion by a pulse initiator in that meter, with those pulses effecting the recording of meter data or information on a data track of a magnetic tape in the recorder. The master recorder receives its source of power from an AC source as shown in FIG. 1 and utilizes the current from that source to drive the motor of the recorder and to further provide power to a rectifier power supply to generate the required DC bias voltages for the circuits in the master recorder.

The master recorder further includes a timing circuit which periodically generates an end-of-interval signal shown as EOI on a conductor 20. This EOI signal is utilized in the master recorder to periodically record on a timing track of its magnetic tape end of interval indications which serve as a time reference for the meter data recorded from the meter 16. Additionally, the timing circuit in the master recorder records a power outage indication on the magnetic tape timing track when there has been a power outage in the power to the recorder 12. This power outage indication is recorded on the time track of the master recorder in the interval in which the power outage occurred so that the utility company, when reading the magnetic tape from the recorder 12 back through the aforementioned translator, will have a record of when the power outage occurred so that they can use this information in billing the customer.

It will also be noted that the AC source also provides alternating current to a plurality of slave recorders 14 through 14′ designated slave recorders #1 through #N. Each of these recorders also contains an AC motor which is driven by the AC source in the same manner as the master recorder. The slave recorders however, can be manufactured much more economically than the master recorder because they do not need the timing circuitry used in the master recorder to generate the EOI and POI pulses.

Figure 2:
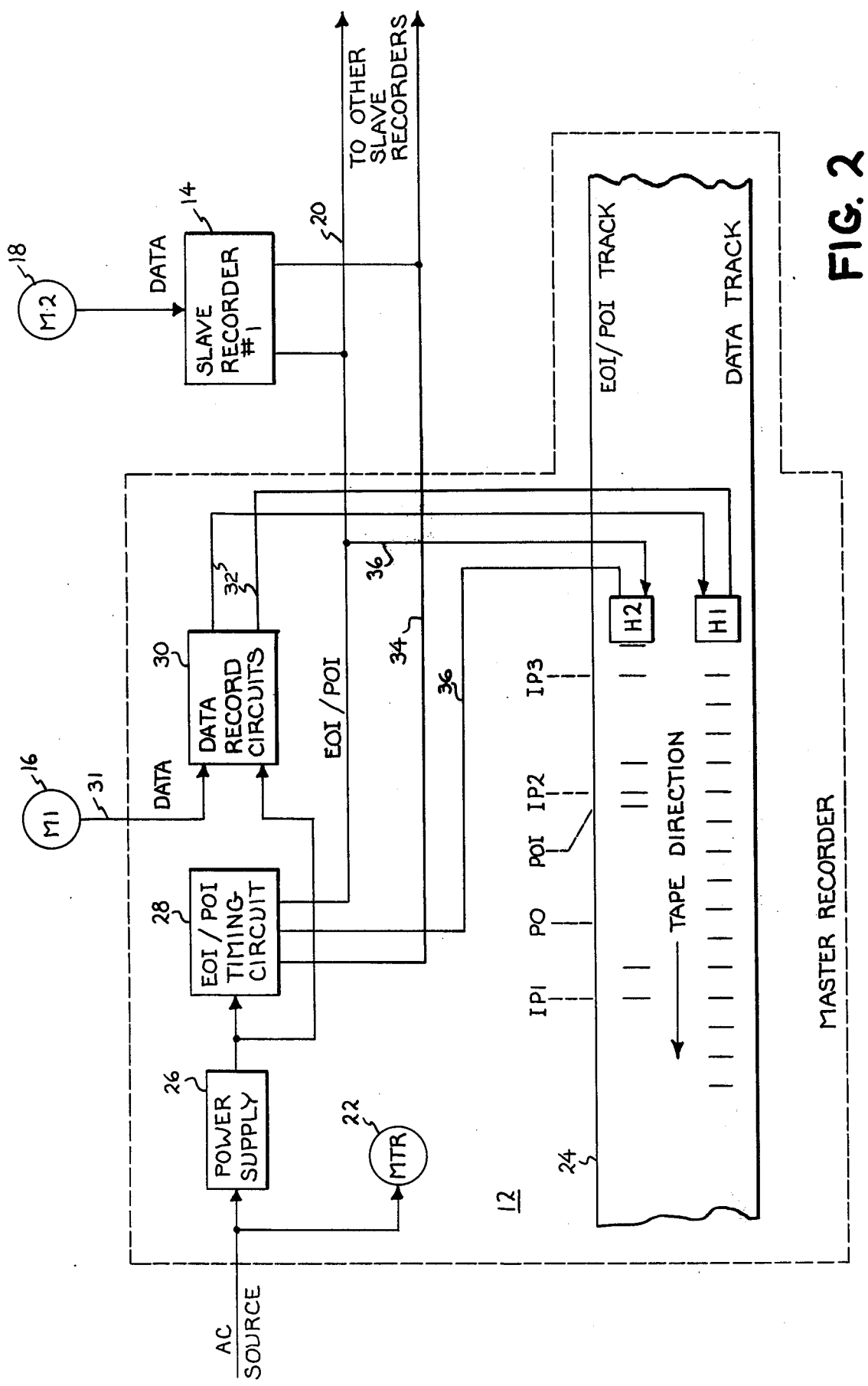
FIG. 2 is a major block diagram schematic of the master recorder of FIG. 1, and illustrates that recorder's connection to the slave recorders of the system.

Referring now to FIG. 2, there is shown in block diagram schematic form, a schematic of the master recorder 12 and that recorder's interconnection of the EOI/POI pulses to slave recorder 14 and other slave recorders via conductor 20. Power from the AC source is provided to a conventional drive motor 22 which is continuously energized so long as the demand recorder is connected to the AC source. The motor is utilized to drive a magnetic tape 24 through a conventional gear train drive mechanism not shown, but well known in the recorder art. A conventional rectifier power supply 26 converts the alternating current from the AC source to suitable DC voltage levels to provide the proper bias voltages to an EOI/POI timing circuit 28 and to data record circuits 30. The data record circuits 30 receive the aforementioned pulses or data information from the meter 16 via a data line 31 and, through suitable circuitry well known in the art, records those pulses in the form of pulse marks as shown on a data track of the tape 24. The data pulses are provided to a data record head H1, via conductors 32 which responds to those pulses to switch the direction of current flow through the head to cause data marks to be recorded on the tape at randomly spaced intervals in accordance with the times of occurrence of the data pulses on conductor 31.

The EOI/POI timing circuit 28 contains a motor driven can assembly having two cam actuated switches for effecting the generation of the EOI/POI pulses respectively on conductor 20. These two switches feed suitable circuits within the timing circuit 28 to generate the EOI/POI pulses in a manner to be described. It will be noted that the EIO/POI pulses on conductor 20 are provided to a second record head H2 via conductors 36. When the tape recorder system of the present invention is in operation, the time interval pulses (EOI) are recorded on an EOI/POI time track of the magnetic tape 24 by the record head H2, as interval marks. Representative interval marks are shown in FIG. 2 on the timing track as IP1, IP2 and IP3. Referring to the IP1 mark as representative, it will be noted that whenever an end-of-interval pulse (EOI) is generated, the two marks are actually recorded. The reason for this is when an EOI switch in the timing circuit 28 opens, one mark is put on the tape as shown directly in line with IP1 mark, and then when the switch closes a second mark is placed adjacent the first mark. The first of these two marks indicates the end of a time interval. The recording of these two marks for each interval is done in a well known fashion by merely switching the direction of current flow through the record head H2.

Also shown in the EOI/POI timing track of FIG. 2 is a POI mark which is shown as being recorded just prior to the IP2 mark. The POI mark (power-outage-indicator) is recorded only when there has been a power outage or an interruption of sufficient length of time in the AC source of power to the recorder. As shown in FIG. 2 at PO (standing for power outage), should a power outage occur in the interval IP1–IP2, the POI mark is recorded just prior to IP2 after power has been restored. The manner in which this recording is done will be more thoroughly understood in connection with a detailed description of the EOI/POI timing circuit 28 as illustrated in FIG. 3.

Figure 5:
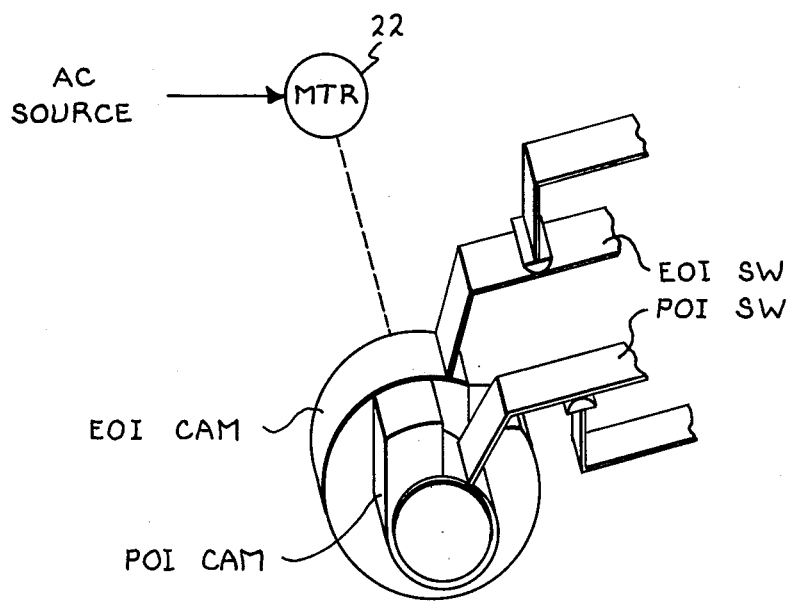
FIG. 5 illustrates a motor driven cam assembly for actuating switches in the master recorder to effect the generation of pulses to record time interval and power outage indicator marks on the tape of the respective recorders.
Figure 3:
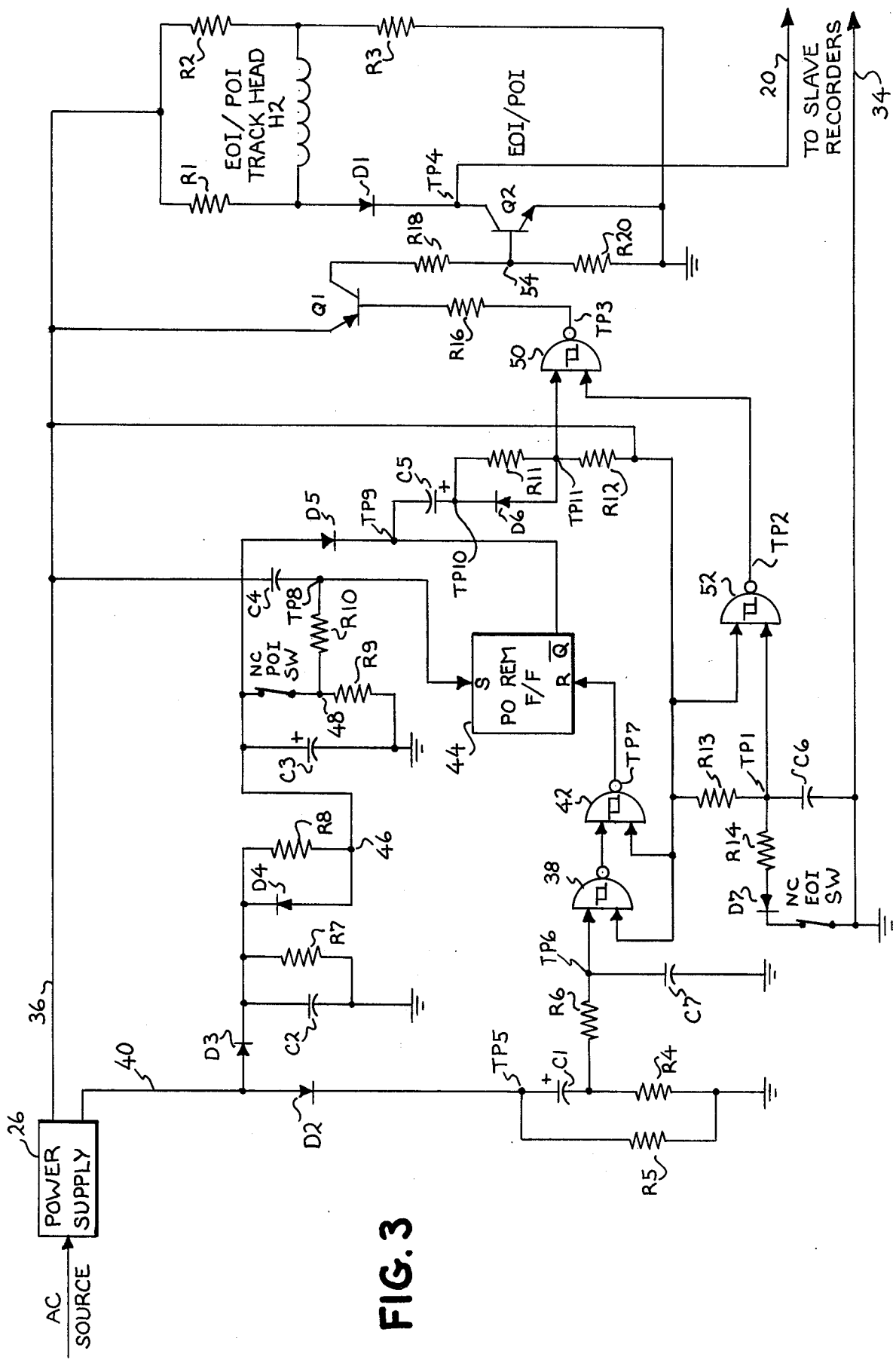
FIG. 3 is a detailed electrical schematic of the master recorder illustrated in FIGS. 1 and 2.

Prior to describing the operation of the timing circuit 28 of FIG. 3, reference is first made to FIG. 5 which illustrates the aforementioned cam shaft assembly comprised of two cams designated an EOI cam and a POI cam. This common cam assembly is driven by the motor 22, through a mechanical linkage as illustrated in FIG. 5 so long as AC power is applied to the recorder. It will be noted in FIG. 5 that two mechanically cam operated switches designated an EOI switch and a POI switch are positioned to ride against their respectively associated cams to open and close with rotation of those cams in accordance with the lobes thereon. In the operation of the recorder, the EOI and POI cams make one complete revolution per time interval. As shown in FIG. 5, the EOI and POI switches are both normally closed. For each complete revolution of the EOI cam, it will be noted that the EOI switch opens for a short period of time determined by the length of the notched lobe on that cam, and will then close shortly after the switch has opened. It is this opening and closing of the EOI switch which effects the recording of the two interval marks for each end-of-interval. In a similar manner, the POI switch, which is normally closed, will ride up on its respective cam lobe to be opened for a specified period of time as determined by the length of the lobe surface. As the POI cam continues to rotate, the POI switch will close by dropping off of the cam lobe to the position shown in FIG. 5. As will subsequently be described, it is this opening and closing of the POI switch which effects the writing of the power outage mark POI on the time track of FIG. 2 when a power outage to the master recorder occurs.

Referring now to FIG. 3, the AC source provides power to a power supply 26 which contains a conventional transformer and rectifier to generate a DC bias voltage on a conductor 36 which provides DC bias to the EOI/POI track head H2, other circuitry in the timing circuit 28 and to the data record circuits 30 of FIG. 2. As can be seen in FIG. 3, the time track head H2 is located or positioned in the center leg of a bridge circuit comprised of resistors R1, R2, R3, a diode D1 and a transistor Q2. Basically, in the operation of the time track head H2, if the switching transistor Q2 is in the off or reverse biased condition, current will flow from left to right through the head H2. In this situation, the current path is from the power supply 26 through the resistor R1, the timing track head H2 and then through resistor R3 to ground. Should the switching transistor Q2 be in the on state, then its collector, at a point TP4, will be near ground and current will flow from the power supply through resistor R2 right to left through the head H2 and to ground via diode D1 and transistor Q2. Thus, it can be seen that the direction of current flow through the head H2 is determined by the on/off status of transistor switch Q2. It is this reversal of current flow through the head H2 which effects the writing of the IP1 through IP3 and POI marks on the timing track of the tape 24 as shown in FIG. 2. The direction of current flow through head H2 is first reversed to write an end-of-interval mark when the spring loaded movable arm of the EOI switch drops off of the EOI cam. This first current reversal will write a mark on the recorder's magnetic tape indicating the end of interval. As an example, as shown in FIG. 2, the first mark of IP1 is written when the spring loaded arm drops off of the EOI cam into the detent lobe and then the second mark of IP1 is written when the spring loaded arm rides back up on the cam surface out of the detent lobe. This effects a double reversal of current through the head H2 to thus write two marks on the tape for each interval.

As previously described, and with the EOI switch closed, head current is also reversed through the track head H2 (FIG. 3) to write a POI mark on the magnetic tape if there has been a power outage to the recorder. This latter reversal of head current occurs preferably at a predetermined point with respect to the EOI signal as indicated by the position of the POI mark to the IP2 mark of FIG. 2. Referring to FIG. 5, it can be seen that this predetermined location for the recording of the POI mark is determined by the relative position of the EOI cam with respect to the POI cam. As will subsequently be described in detail, a POI mark is written if the power outage exceeds a first predetermined time duration (eg. eight seconds) but a POI mark is not written on the tape if there is a power outage indication of less than a second time duration (eg. four seconds).

Reference is now made to the output of the power supply 26 which provides an alternating current from the secondary of the transformer of that power supply on a conductor 40 to the anodes of two diodes D2 and D3. Diode D2 provides positive voltage halfway rectified current to an RC integrator or storage circuit comprised of a capacitor C1 in series with a resistor R4 and a resistor R5 which is connected in parallel with capacitor C1 and R4, with the junction of capacitor C1 and R5 being connected to a cathode of diode D2. When AC power is being provided to the master recorder of FIG. 3, the capacitor C1 is charged to the peak of the transformer secondary voltage on conductor 40. The charge path for capacitor C1 is through diode D2, capacitor C1 and resistor R4 to ground. The time constant of C1, R4 and the parallel resistor R5 is very long (approximately 8 seconds) with respect to the line frequency. Therefore, since C1 is charged to the peak of the AC secondary voltage, there will be essentially no voltage drop across resistor R4, after C1 is fully charged, and thus there will be no input voltage to the first input of a conventional NAND Schmidt trigger circuit 38 via a coupling resistor R6. The Schmidt trigger circuit 38 is a commercially available circuit available from many manufacturers of various integrated circuits and is sold generally under the designation as a 4093 NAND quad input Schmidt trigger circuit. A roll-off capacitor C7 is connected from TP6 to ground to prevent voltage spikes from falsely triggering circuit 38.

Under normal operation of the timing circuit of FIG. 3, since there is no input voltage to the top input of circuit 38, the output of that circuit is a binary 1. This is explained by observing that the positive binary 1 bias voltage on conductor 36 is provided to the bottom input of trigger circuit 38. The bias voltage is also applied as one input to a second NAND trigger circuit 42. Since both inputs to circuit 42 are binary 1's its output is a binary 0 being applied to a reset input terminal of a power outage remember Flip Flop PO REM F/F designated by the numeral 44. Since no reset pulse is applied to Flip Flop 44 during normal operation, it can be seen that that Flip Flop will normally be in the set state. How this Flip Flop gets into the set state will subsequently be described.

Still referring to FIG. 3, the Diode D3 also conducts to provide positive rectified current to an RC integrator comprised of a capacitor C2 in parallel with a resistor R7. The cathode of Diode D3 is also connected to the cathode of a third diode D4 which is in parallel with a resistor R8. The lower junction 46 of Diode D4 and resistor R8 is connected to one input of a capacitor C3. The other end of the capacitor C3 is connected to ground. Series connected resistor R9 and the normally closed POI switch are in parallel with C3. One end of R9 is connected to ground and the top terminal of the closed POI switch is connected to the positive input terminal of the capacitor C3. A resistor R10 is connected at a junction 48 at the top of resistor R9 and the bottom terminal of the POI switch to provide a set pulse to the S input terminal of the PO REM Flip Flop 44.

A Capacitor C4 is also connected to the DC bias output voltage line 36 at one end and connected to the S input terminal of Flip Flop 44 as well as to one end of the resistor R10 at a junction designated TP8.

The output of the REM Flip Flop 44 is from a $\overline{Q}$ output terminal and its output signal is provided to the cathode of a Diode D5 having its anode connected to the positive input terminal of capacitor C3 and the stationary contact of the POI switch. The $\overline{Q}$ output terminal Flip Flop 44 is also provided to a coupling capacitor C5 having its positive terminal connected to the parallel combination of a Diode D6 and a resistor R11. The anode of Diode D6 at a junction TP11 is connected to one input of a NAND Schmidt trigger circuit 50 and also to one input of another NAND Schmidt trigger circuit 52 via a resistor R12. It will be noted that the DC bias voltage on conductor 36 is connected to the bottom end of resistor R12 as well as to the top input of Circuit 52 and to the input of Circuits 42 and 38 as previously described. The purpose of applying the bias voltage on conductor 36 to these three latter trigger circuits is to hold the input terminals of those circuits to a binary 1 state so that they may serve a switching function in accordance with their other inputs.

Referring to the Schmidt trigger Circuit 52, it will be noted that the second input of the gate of that circuit is from a junction TP1 formed by the connection of a resistor R13 connected to the bias supply, a resistor R14 and a capacitor R6. The other end of capacitor C6 is connected to ground in conjunction with the switched end of the EOI switch. The other end of the EOI switch is connected to the cathode of a Diode D7, having its anode connected to the other end of resistor R14. The output of trigger circuit 52 is provided as a second input to the Schmidt trigger circuit 50, which when enabled, provides an output signal to the base of switching transistor Q1 via a resistor R16. The emitter of transistor Q1 receives bias voltage via conductor 36 and its collector is connected to ground via two series connected resistors R18 and R20. The junction of resistors R18 and R20 at a point 54 provides an input pulse to the base of a transistor Q2 to control the switching of that transistor. It will be noted that the emitter of transistor Q2 is connected to ground, thus when that transistor is turned on or in the saturated state, it conducts to make the collector at a point TP4 go to ground or binary 0 to cause the Diode D1 to conduct to thus cause current to flow through the track head H2 from right to left in the manner as previously described. It should be noted that the combination of the Q1 and Q2 transistors with their associated resistors and diodes in conjunction with the track head H2 comprise a time record circuit for recording the time reference marks IP1 through IP3 as well as the power outage mark POI. As can be seen in FIG. 3 in conjunction with FIGS. 2 and 1, the EOI/POI pulse output from the collector (TP4) of transistor Q2 is provided on conductor 20 along with a ground on conductor 34 to the slave recorders in the system designated 14 and 14'. The manner in which the EOI/POI pulses affect the operation of the slave recorder will subsequently be described in connection with FIG. 4.

OPERATION OF THE INVENTION

To understand the operation of the invention and the timing circuits of FIG. 3, it should be assumed that the demand recorder has been operating for a sustained period of time. With this assumption, the initial circuit conditions are as follows:

(1) The power outage remember Flip Flop 44 is in the set state, thus its $\overline{Q}$ bar output terminal is a binary 0.

(2) Capacitor C1 is charged to the peak of the transformer secondary voltage from the power supply 26. As previously mentioned, the charge path for capacitor C1 is from the power supply 26 through D2, C1 and R4 to ground. This, for all practical purposes, establishes a binary 0 or 0 volt signal at the input to the Schmidt trigger circuit 38 shown at TP6 on FIG. 3.

(3) With reference to capacitor C5, since the output signal from the $\overline{Q}$ terminal of Flip Flop 44 is a binary 0, that capacitor is now charged to the DC bias supply voltage via Diode D6, resistor R12 and conductor 36 to the power supply.

(4) Capacitor C3 is discharged. This capacitor is held discharged to ground by the conduction of Diode D5 caused by the binary 0 state of the $\overline{Q}$ output of Flip Flop 44 which clamps the positive terminal of capacitor C3 to ground. Additionally, it should be noted that for most of the timing cycle (ie. most of the time of rotation of the EOI and POI cams) capacitor C3 is shunted by a low impedance resistor R9 which is connected to ground and in series with the normally closed contact of the POI switch. Also at this time, assuming that the EOI switch is closed, Diode D7 is forward biased to thus apply a binary 0 voltage to the Schmidt trigger NAND circuit 52. This causes the output of gate 52 at point TP2 to therefore be a binary 1. This binary 1 signal, in conjunction with the other binary 1 signal now present at the other input to gate 50, will cause the output at that gate to thus be a binary 0, which in turn turns on transistor Q1 to in turn apply a binary 1 signal to the base of transistor Q2 turning that transistor on. Thus, current flow through head H2 is from right to left. With the above conditions now established, let it be assumed that at some point in the operating cycle of the master recorder, the EOI cam rotates to a point which causes the EOI switch to open. When this occurs, Diode D7 is thus prevented from conducting allowing the junction at TP1 to go to a binary 1. Since the inputs to NAND trigger circuit 52 are now both binary 1's, its output at TP2 goes to a binary 0. This binary 0 signal is now applied to NAND gate 50, which in turn causes the output of that circuit at TP3 to go to a binary 1, thus turning off PNP transistor Q1 and effecting the turnoff of the switching transistor Q2. As previously described, with transistor Q2 now turned off the direction of head current is reversed, whereby the current flows from the power supply through resistor R1, Head H2 and through R3 to ground. At this time, the EOI pulse is generated to write one of the IP1, IP2 or IP3 marks on the tape 24 as indicated in FIG. 2. As the EOI cam continues to rotate, a bit further on in the cam cycle rotation, the EOI switch recloses by the switch riding back up on the cam. With the closing of the EOI switch, Diode D7 is forward biased again, which in turn causes transistors Q1 and Q2 to be turned back on via gates 50 and 52 as previously described. This causes a second mark to be written on the tape at the second position as shown in FIG. 2 while the circuit is restored to its original condition.

Referring to capacitor C6, R14 and R13, those components are included in the timing circuit and serve as a filter to eliminate the effects of switch or contact bounce on the circuit from the EOI switch.

Let it now be assumed that power is still applied to the recorder and at some point in the cam rotation cycle, the POI cam (FIG. 5) causes the POI switch to ride up on the high lobe of that cam to thus open the POI switch. It should be noted in FIG. 3, that the opening of the POI switch, at this time, has no affect on the status of the timing circuit, as the diode D5 is still conducting and holding the high or positive end of the capacitor C3 to ground, thus keeping that capacitor discharged. As a result, the opening and closing of that switch has no effect on the set input terminal of the Flip Flop 44.

Now assume that the demand recorder of the present invention has been operating for a period of time and that a power outage has occurred lasting, for example, eight seconds or more. At this time AC power is no longer available via diode D2 to maintain the charge on capacitor C1, thus capacitor C1 will discharge through resistors R4 and R5. At this point, the entire recorder stops and all circuits remain in their present state, including the EOI and POI cams stopping to maintain their present position.

Let it now be assumed that AC power is restored to the power supply 26. At this time half wave AC binary 1 signals are coupled through capacitor C1 to the first input of gate 38, and since the lower input to gate 38 is also a binary 1, that gate's output will go to a binary 0 to in turn cause gate 42 to generate a binary 1 reset signal to reset the PO REM Flip Flop 44. It should be noted at this time, that the $\overline{Q}$ output of the REM Flip Flop now goes to a binary 1, reverse biasing diode D5 to thus remove the clamp voltage from capacitor C3. Also at this time, the binary 1 signal on the $\overline{Q}$ output of Flip Flop 44 allows capacitor C5 to discharge via resistor R11 and and resistor R12 to the power supply 26. At this time, the REM Flip Flop is in effect remembering that there has been a power outage.

Since the POI cam is now rotating, that cam will cause the POI switch to open. When this occurs, the shunt, via the POI switch and resistor R9 around capacitor C3 is removed to thus allow capacitor C3 to charge. The charge path for the capacitor C3 is now from the power supply through diode D3, resistor R8, and capacitor C3 to ground. Now, as the POI cam continues to rotate, a short interval later, determined by the length of the cam duration, the POI switch will reclose. When this occurs, the voltage on capacitor C3 is applied to the S input terminal of REM Flip Flop 44 via the POI switch and resistor R10 due to the voltage drop across resistor R9 in series with the POI switch. Thus, the REM Flip Flop is now set causing its $\overline{Q}$ output terminal to go to a binary 0. The binary 0 output of the REM Flip Flop now couples a negative pulse through capacitor C5 and diode D6 to the top input of gate 50. This negative input thus disables gate 50, causing its output at TP3 to go to a binary 1 state to turn off transistor Q1.

Shortly thereafter, after C5 is charged to the bias voltage from line 36 through R12 and D6, transistor Q1 is turned on again as determined by the value of C5. With transistor Q1 being turned off and on, it effects the turning off and on of the Q2 transistor which causes a reversal of head current, to thus generate the POI pulse to write the POI mark on the magnetic tape at the point shown as POI just prior to the IP2 mark in FIG. 2.

It should be noted at this time, if the power outage had been short (for example less than 4 seconds) capacitor C1 would not have been able to completely discharge. Following the restoration of power, the voltage seen at the top input of gate 38 at TP6 will be the difference between the peak AC voltage and the remaining voltage on capacitor C1. If this difference is less than the threshhold voltage of gate 38, no reset pulse will be generated and the power outage will be ignored. Further, it should be noted, that the discharge time of capacitor C5 should preferably be shorter than the charge time of capacitor C3. This is to assure that the POI pulse will be generated in those cases where power restoration is coincident with, or very near, the opening of the POI switch.

In the present invention of FIG. 3, there is a possibility that the DC power supplied to the REM Flip Flop during a power outage may drop faster than the 8 seconds required to generate the reset pulse at TP 7. (That is, C1 may not discharge far enough to allow gate 38 to be enabled upon power restoration to generate the reset pulse). Thus, when power is restored, Flip Flop 44 may try to come up in either the set or reset state. To assure that the REM Flip Flop always comes up in the set state, unless a reset pulse is present at TP7, capacitor C4 has been inserted into the circuit. As can be seen in FIG. 3, if a reset pulse TP7 is not present, the charge path for capacitor C4 is from the power supply through C4, R10, R9 to ground. Thus, when power is applied, capacitor C4 will immediately charge to apply a pulse to the set input of the REM Flip Flop setting that Flip Flop to an initial condition when the system is first started up. Also, since capacitor C5 will start to discharge during a power outage, it is preferable that its time constant be longer than the time constant of capacitor C1. By so making the time constant of C5 larger than C1, the possibility is eliminated of the input at TP11 of gate 50 from being held at a binary 1 or binary 0 which would effect the generation of a false power outage signal immediately following the restoration of power. Thus, it can be seen, that the proper sizing of the just described components eliminates the possibility of producing a false POI mark on the tape. It is obvious however, that there is no problem if the power outage is long enough to allow capacitor C1 to discharge sufficiently to produce the flip flop reset signal via gates 38 and 42.

Referring now to FIGS. 2 and 3, after the POI mark has been written, at some point the EOI switch will again open as previously described. This causes gates 50 and 52 to cause transistors Q1 and Q2 to be turned off to thus write the first half of the interval pulse IP2 on the EOI/POI track. Then, as the EOI switch closes, diode D7 is again forward biased to now cause transistors Q1 and Q2 to be turned on, reversing the direction of current flow through the track head H2 to thus write the second pulse as shown in FIG. 2.

Figure 4:
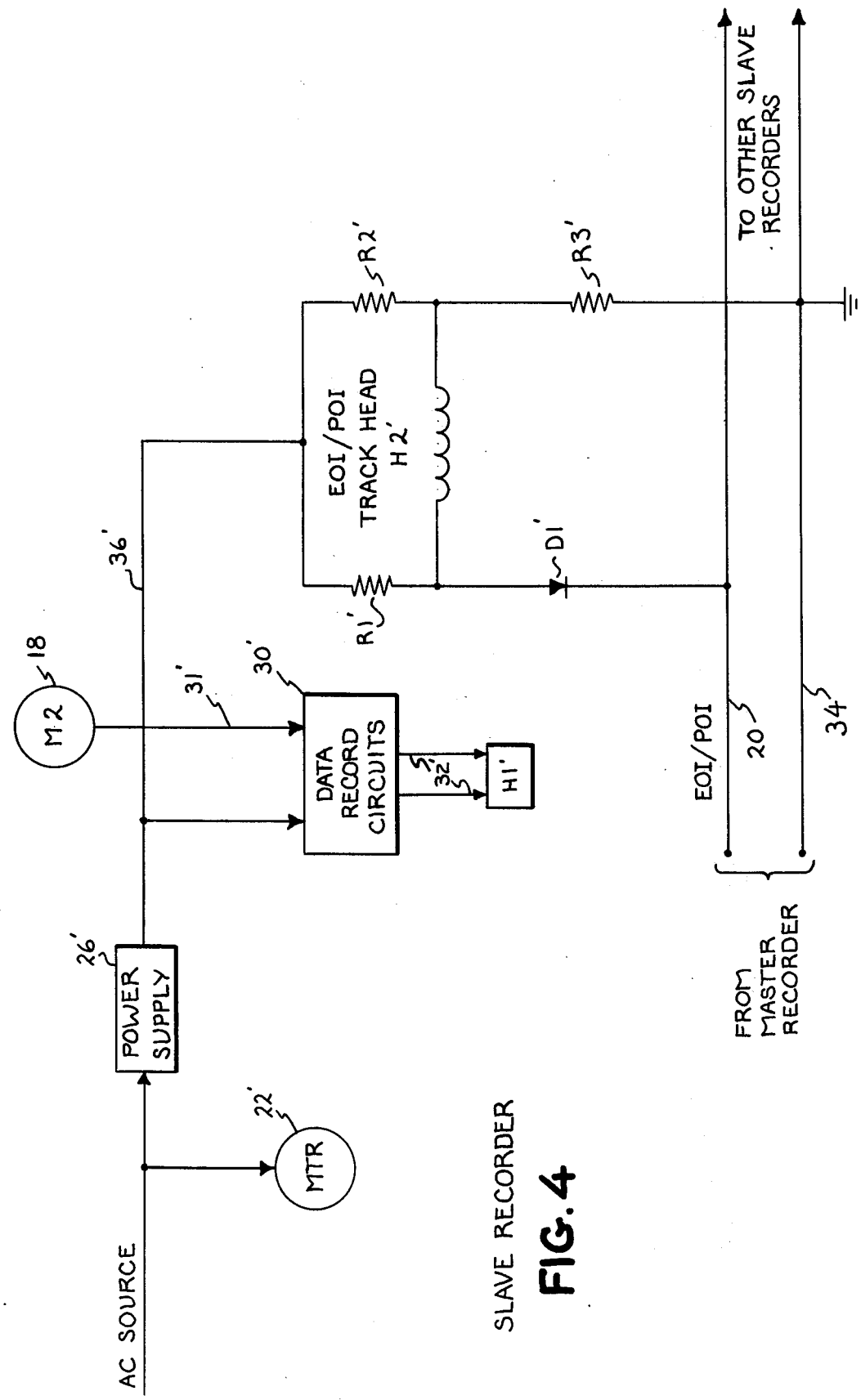
FIG. 4 is a schematic of the slave recorders of FIG. 1 in accordance with the present invention.

With the preceding background of the operation of the timing circuit of FIG. 3, reference is now made to that portion of the invention encompassing a representative one of the slave recorders as shown by FIG. 4. In FIG. 4, those components are numbered with like numbers serving as counterparts as previously described in FIG. 3 having a prime affixed as a subscript thereto. As shown by FIG. 4, and also as shown by FIG. 1, each of the slave recorders preferably receives its power from the same AC power source as the master recorder. Thus, all of the recorders of the system are supplied from the same power source. Further, as shown in FIG. 4, each of the slave recorders contains its own power supply 26', similar to that contained in the master recorder. The output of the power supply 26' is via conductor 36' to provide the DC bias voltages to the data record circuits 30' and to the EOI/POI track head circuit H2'. Similarly, the meter M2, as previously described in connection with FIG. 1, provides data input pulses via conductor 31' to the data record circuits for recording meter data on the data track of the slave recorder 14 via conductors 32' and the head H1'. It will be noted in the representative slave recorder of FIG. 4, that all of the circuitry required to write the end of interval pulses and the power outage indicator pulses has been eliminated from those recorders to thus allow those recorders to be manufactured in a much more economical fashion. In other words, in the present invention only one master recorder is required to generate all of the interval information and power outage information utilized in the entire tape recording system, since the slave recorders receive the signals from the master recorder via conductors 20 and 34 as shown in FIG. 4.

It will be noted in FIG. 4, that the time record circuit, comprised of transistors Q1 and Q2 in FIG. 3, have also been eliminated, with the only similar components remaining in the track head circuit of the slave recorder being diode D1', resistor R1', R2' and R3'. Referring to FIG. 4, and to the point TP4 of FIG. 3 where the EOI/POI pulses are generated on conductor 20, it can be seen that those pulses control the track head circuit of FIG. 4 by causing diode D1' to turn on and off in the same manner as previously described for diode D1 in FIG. 3, to control the direction of current flow through head H2'. Thus it can be seen, that EOI/POI pulses generated by the master recorder are simultaneously received by all of the slave recorders, whereby every recorder in the system is synchronized to write the end of interval and power outage indicator marks on their respective time tracks.

In the types of systems contemplated by the present invention, the synchronized slave operation just described is highly desirable, to utility companies. Frequently, they desire to monitor data information on a plurality of recorders from corresponding metering devices whereby all of the information recorded on the different recorders, even though it may be information of different significance, is interrelated to a common monitoring system so that when a power outage occurs at the recorders, that power outage is simultaneously indicated on each and every one of the recorders in the entire system. In large systems where many recorders are utilized in the manner described, the present invention provides a large economic cost savings to the utility companies since they must only purchase one master recorder, such as that shown by the master recorder of FIG. 3, which contains the necessary circuitry to generate the end of interval and power outage pulses for the entire system.

Figure 6:
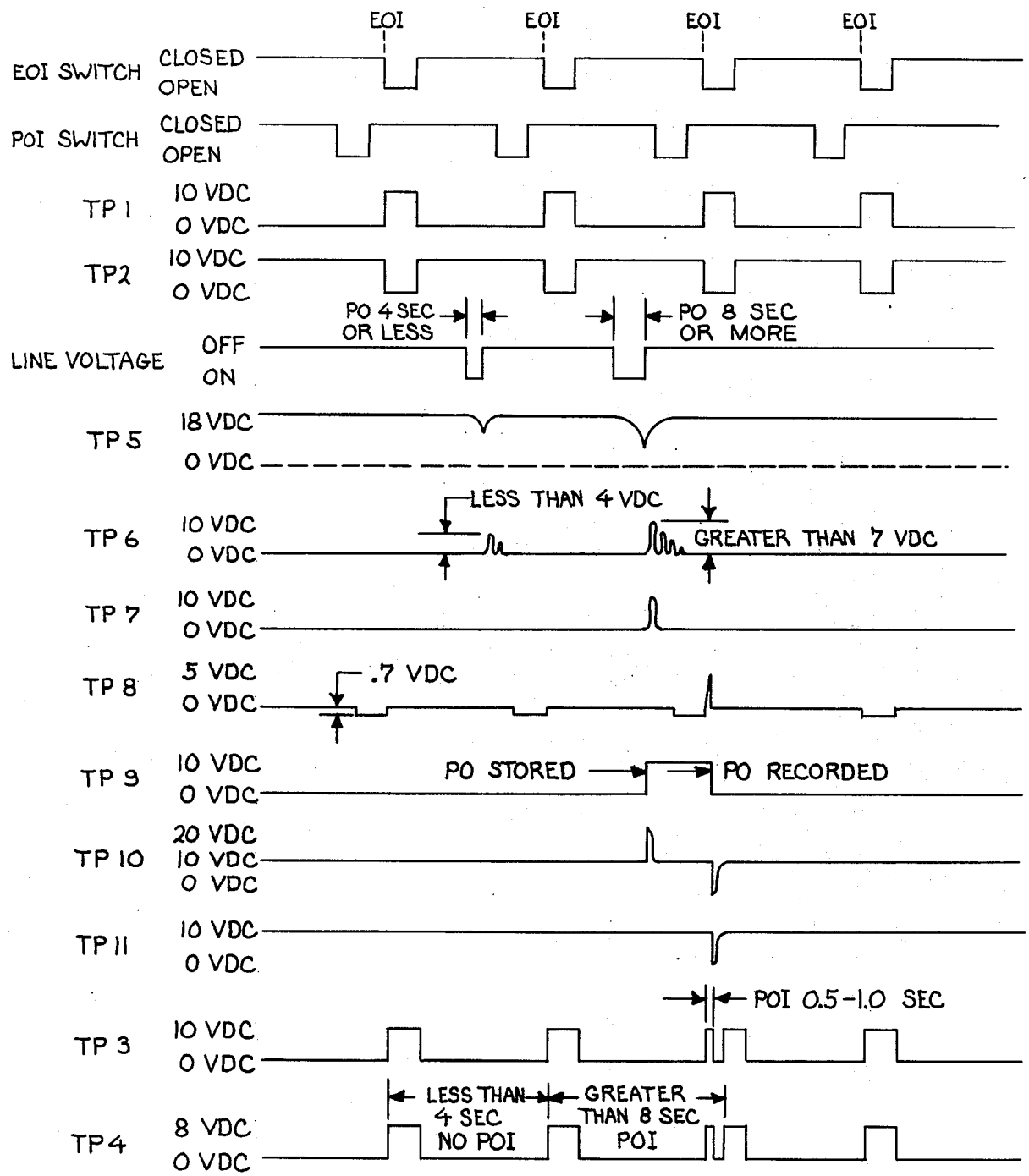
FIG. 6 is a timing diagram illustrating the major signals generated by the master recorder of FIG. 3 and is useful in understanding the operation of the present invention.

While the invention just described is believed to be readily understandable from the foregoing description, for purposes of complete disclosure and a thorough understanding of the invention, the timing diagram of FIG. 6 has been included having waveforms TP1 through TP11 corresponding to test points TP1-TP11 of FIG. 3, appearing as viewed on an oscilloscope. A correlation of test point designations are believed to be self explanatory and thus no further detailed operational description of the invention is considered necessary.

It will be apparent to those skilled in the art from the foregoing description of my invention, that various improvements and modifications can be made therein without departing from the true scope of the invention. Accordingly, it is my intention to encompass within the scope of the appended claims the true limits and spirit of my invention.

What I claim as new and desire to secure by Letters Patent of the United States is:

1. An improved data recording system of the type including recorders susceptible to a power outage condition having data recording circuits for recording data on magnetic tape derived from pulse initiators in meter devices associated with the respective recorders comprising:

a master recorder and at least one slave recorder, each of said recorders including a time record circuit having a recording head for normally recording time interval marks on said magnetic tape as a time reference for said data, said master recorder having a timing circuit including means for providing end-of-interval pulses to its time record circuit at periodic intervals so long as power is being supplied to said master recorder to effect the writing of said time interval marks on the magnetic tape by said master recorder's recording head, said timing circuit further including means for detecting a power outage condition lasting in excess of a predetermined time duration to supply a power outage pulse to said master recorder's time record circuit to effect the writing of a power outage mark on the magnetic tape by said master recorder's record head which identifies the time of the occurrence of the power condition and the time interval in which the power outage condition occurred; and means connecting the output of the time record circuit of said master recorder to the input of the time record circuit of each of said slave recorders, whereby the end-of-interval pulses and the power outage pulse generated by said master recorder effect a simultaneous recording of said time interval and power outage marks on the magnetic tape of all of the recorders.

2. The improved data recording system, as recited in claim 1, wherein the time record circuit of said master recorder includes a switch connected in circuit with the record head of each recorder and responsive to the output of the time record circuit of said master recorder to effect the recording of said time interval and power outage marks on the magnetic tape of the respective recorders.

3. The improved data recording system as recited in claim 2, wherein said switch comprises a transistor.

4. The improved data recording system as recited in claim 1, wherein said means for providing said end-of-interval pulses comprises a motor driven cam actuated switch which opens and closes periodically to generate said end-of-interval pulses to effect the recording of said time interval marks on the magnetic tape of each recorder.

5. The improved data recording system as recited in claim 1, wherein said means for detecting a power outage condition comprises a power outage remember flip-flop normally operating in a set state, a time delay circuit responsive to the input power to said master recorder to reset said power outage remember flip flop upon restoration of power to said master recorder following a power outage condition, a motor driven cam actuated switch which opens and closes periodically, said switch applying a set pulse to said power outage remember flip flop upon its activation at an instant in time after said flip-flop has been reset to effect the generation of said power outage pulse to record said power outage mark on the magnetic tape of each of said recorders.

* * * * *